A. BOLZANI.
BRAKE FOR HOISTING DEVICES.
APPLICATION FILED NOV. 26, 1909.

969,834.

Patented Sept. 13, 1910.
2 SHEETS—SHEET 1.

Witnesses:
Wm H. Bates
L. B. Middleton

Inventor.
Anton Bolzani
by Hubert W. Jenner
Attorney.

A. BOLZANI.
BRAKE FOR HOISTING DEVICES.
APPLICATION FILED NOV. 26, 1909.
969,834.
Patented Sept. 13, 1910.
2 SHEETS—SHEET 2.
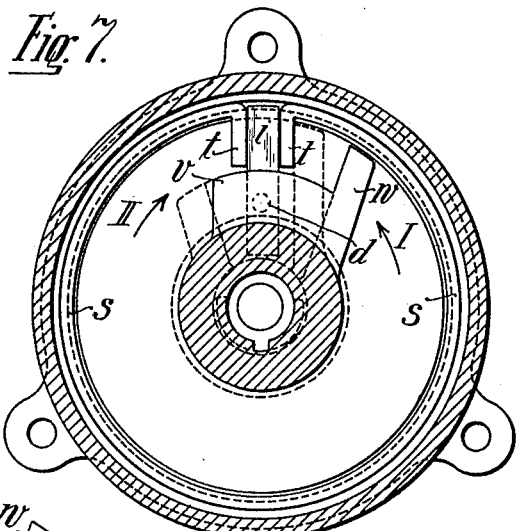
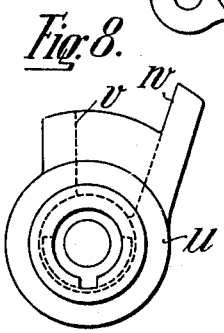
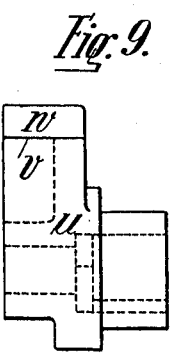
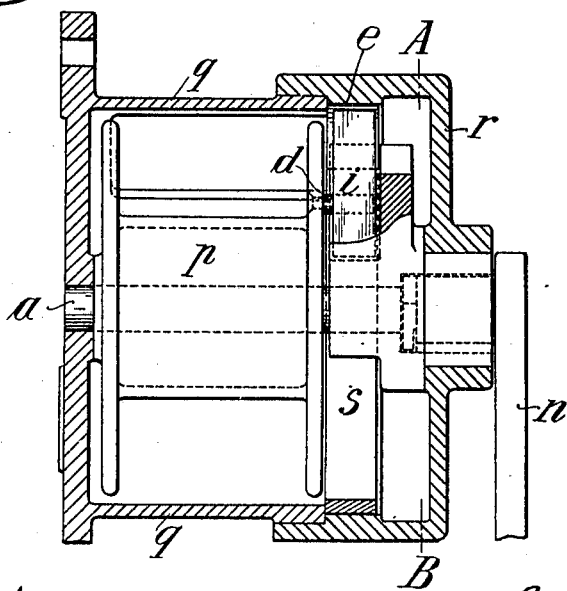

UNITED STATES PATENT OFFICE.

ANTON BOLZANI, OF BERLIN, GERMANY.

BRAKE FOR HOISTING DEVICES.

969,834. Specification of Letters Patent. Patented Sept. 13, 1910.

Application filed November 26, 1909. Serial No. 529,961.

*To all whom it may concern:*

Be it known that I, ANTON BOLZANI, residing at Berlin, Prussia, Germany, have invented certain new and useful Improvements in or Relating to Brakes for Hoisting Devices; and I do hereby declare the following to be a full, clear, and exact description of the invention, such as will enable others skilled in the art to which it appertains to make and use the same.

This invention relates to a brake for hoisting devices which holds the load hoisted in an absolutely reliable manner, and in which owing to the almost complete absence of inner friction between the intermediate means used for transmitting the force to the parts of the brake, the brake pressure can be regulated with the greatest accuracy, that is to say, the braking pressure and the braking friction reduced, for the purpose of lowering the load, so that the empty load hook can be lowered without any friction.

The invention is equally well applicable to brakes with a brake ring, that is a hollow cylindrical brake body rotatable in one direction only, and to those with a stationary or fixed brake ring. Both methods of application are illustrated in the accompanying drawings.

Figure 1:
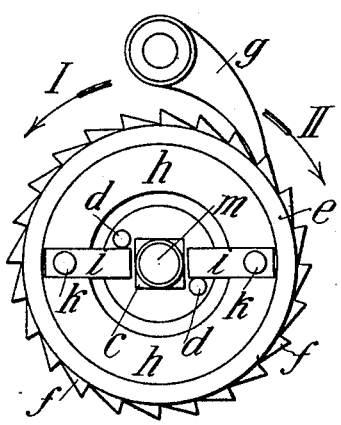
Figure 2:
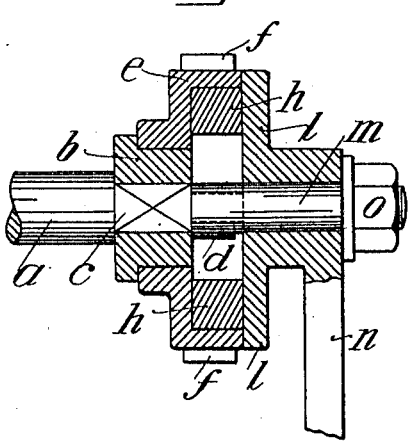
Figure 3:
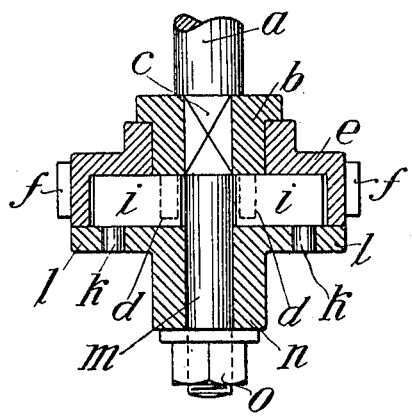
Figure 4:
Figure 5:
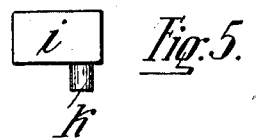

The brake is shown in the accompanying drawing in Figure 1 in front elevation, with the driving part removed, in Fig. 2 in a vertical longitudinal section, and in Fig. 3 in a horizontal longitudinal section. Figs. 4 and 5 are two views of one of the two intermediate members transmitting the brake pressure. Figs. 6–9 show a second construction of the brake applied to a simple rope or cable winch. Fig. 6 is a vertical longitudinal section through the winch with the brake. Fig. 7 is a section on line A—B of Fig. 6, and Figs. 8 and 9 are respectively front elevation and side elevation of a "driver" used in this construction.

To the load spindle $a$ is secured a sleeve $b$ for instance, by means of a square portion $c$, so that it should not rotate, the said sleeve being provided at its free front side with two pin-like projections $d$ $d$. On the said sleeve is mounted in a loosely rotatable manner a hollow cylindrical sleeve $e$ which constitutes the brake ring and which is provided on its outer circumference with a rim of ratchet teeth $f$ with which engages a pawl $g$, so that the sleeve $e$ is prevented from rotating in the direction of lowering, that is to say in the direction of the arrow I. In the sleeve $e$ are loosely mounted two ring sections $h$ $h$ which fit exactly into its hollow space and constitute the brake jaws. Between the said jaws are left free intermediate spaces in which are mounted intermediate levers $i$ $i$ with a very slight play. These intermediate parts are each provided with a pin $k$ by means of which they engage with the corresponding holes of the flange $l$ of the driving part $n$ (crank, hand wheel or the like) mounted in a loosely rotatable manner on the extension $m$ of the spindle $a$. A nut $o$ situated on the screwthreaded end of the spindle prevents the driving part $n$ from coming off.

When the driving part $n$ is turned in the direction of hoisting, that is to say, in the direction of the arrow II, the intermediate parts $i$ are driven in the same direction by means of the pins $k$. The ends of the intermediate parts $i$ projecting inward engage then with the pins $d$ of the sleeve $b$ secured to the spindle $a$, on which the load acts in the opposite direction, that is to say, so that it holds it back. This results in the parts $i$ being turned out of their original radial position, whereby again the two brake jaws $h$ $h$ having the shape of ring sections are moved apart and in that way pressed with their outer surface against the inner surface of the sleeve or brake ring $e$. In that way the driving machine part is coupled to the brake ring $e$ and at the same time to the sleeve $b$, that is to say to the load spindle $a$. During further rotation the load will be raised, and the whole system rotated in the direction of the arrow II, the ratchet teeth $f$ sliding under the ratchet pawl $g$. When the rotation stops, the said conditions remain within the brake, and the brake friction will continue to act freely, as the load, even without any driving of the driving machine part in the direction of the arrow II, has the tendency to bring about the turning of the intermediate members $i$, that is to say, to exercise braking and coupling action. The load, therefore, holds itself still.

If the driving machine part is now rotated in the direction of lowering, that is to say, in the direction of the arrow I, the pressure on the intermediate members $i$ will be exercised at the place of the pin $k$, in the direction of the arrow I. This pressure has the tendency to bring the intermediate members into radial position, that is to say, to reduce the distance apart of the brake jaws $h$ or to reduce the brake pressure. If the said reduction is sufficiently great, a sliding at the brake surfaces, that is to say, a sinking of the load will take place. If thereupon the driving machine part is stopped, braking and fixing of the load will again take place. The sinking of the load will take place only as long as the driving machine part is moved in the direction of sinking, namely in a thoroughly reliable manner, since the attendant has the lowering of load completely under his control, without any danger of automatic lowering.

Owing to the fact that there is no sliding braking, or at least no sliding braking worth mentioning, between the intermediate members $i$ on the one hand, and the driving machine part or the pin $d$ of the sleeve $b$ coupled to the load spindle, on the other hand, for the purpose of starting the braking, but only a practically simple pressure, no inner work is required for bringing about the braking. The pressures exercised by the driving machine part and by the load spindle are, therefore, transmitted without reduction to the brake jaws, that is to say, the brake action is a maximum. The same conditions obtain during the lowering, that is to say, when the brake is released. The brake obeys the attendant therefore in the most accurate manner and there is no possibility of jerky working.

As a special advantage it must be pointed out that it is possible in practical construction to make the leverage on the intermediate parts $i$ any desired, that is to say, entirely to suit the required brake action.

As an example for illustrating a second form of the invention has been selected an ordinary cable winch Figs. (6–9) with a cable drum $p$ mounted loose on the spindle $a$ and surrounded by a casing $q$. The casing is closed at its front side by means of a cap $r$ which at $e$ forms the brake ring with which engages the annular spring brake jaw body $s$. The ends of the said brake jaw body are bent to right angles at $t$ at the point of division, and the lever-like intermediate part $i$ is mounted between the said bent portions $t$. To the cable drum $p$ is secured a pin $d$ engaging with a perforation of the lever body, so that the latter is driven by the cable drum, that is to say, by the load, and can turn at the same time about the pin $d$. In the central opening of the cap $r$ is arranged a driver or tappet $u$ provided with a bore for receiving the load spindle $a$ and a widened bore for receiving the connecting part for a crank, that is to say, for a driving part $n$. The method of coupling the crank to the driver is immaterial and can be replaced by others. Owing to this coupling, the driver $u$ becomes a driving machine part. The driver is provided with two projections; a short one $v$ and a long one $w$. The short projection $v$ during the rotation of the driving machine part in the direction of the arrow II, that is to say, in the direction of hoisting comes to rest against the spreading lever $i$ projecting radially inward between the bent portions $t$ of the brake jaw, while the long projection $w$, during the rotation in the direction of the arrow I, that is to say, in the direction of lowering, comes to rest against one of the projections $t$ of the brake jaw body, without coming into contact with the spreading lever. The distance between the projection $v$ and $w$ is such that the two together never can come into engagement, but always only one of them, according as the driver $u$ is rotated in one or in the other direction.

The working of the device is as follows: If no hoisting or lowering is effected, that is to say, neither the short projection $v$ nor the long projection $w$ are in engagement under pressure with the spreading lever $i$, or with the angular projection $t$, the load will have the tendency to turn the spreading lever by means of the pin $d$. That brings it out of its radial position and spreads apart the annular brake jaw body $s$ so that it is pressed against the brake surface $e$, that is to say, the load drum $p$ will be prevented from rotating, and the load from sinking. If the load is to be hoisted, the driving machine part is rotated in the direction of the arrow II. The short projection $v$ of the driver $u$ will engage then with the spreading lever $i$ and bring it into the radial position, the surfaces of the projections $v$ and those of the lever engaging with each other in a perfect manner. In that way the brake coupling between the annular body $s$ and the brake surface, will be broken. The spreading lever $i$ cannot come into oblique position toward the other side and thus exercise a new braking action, owing to the short projection $v$ acting also on the point of rotation of the spreading lever which is formed by the pin $d$, and thus, without rotating the lever $i$, acting on the pin $d$ and on the load drum. The drum will, therefore, be rotated without friction in the direction of hoisting. If the load is to be lowered, the driving machine part, that is to say, the driver $u$ is rotated in the direction of the arrow I, so that the long projection $w$ comes into engagement with the corresponding angular projection $t$ of the annular brake jaw body. The load which, immediately after the putting out of action of the short projection $v$, brings about an oblique position of the spreading lever $i$, and therefore braking, is lowered by the projection $w$, the brake friction being overcome. It must be taken into consideration that, as the projection $w$ acts on the projection $t$ of the annular brake jaw body, and the latter in its turn on the spreading lever, the pressure exercised by the former, brings about a decrease in the oblique position of the spreading lever, although only to a slight extent, which results in a slight reduction of the braking action, although not in its complete cessation. It is not necessary therefore in lowering, to overcome the complete brake action which exists when the load is stationary.

What I claim is:

1. In a brake, the combination, with a brake cylinder, and means for preventing it from revolving backward; of a driving member and a driven member journaled concentric with the brake cylinder, brake jaws normally revoluble in the said brake cylinder, an operating lever arranged between the ends of the said jaws and provided with a laterally projecting pin which is pivoted in a hole in one member, and a lateral projection on the other member which engages with the said lever and which causes it to turn on its pivot pin by the resistance of the load to the forward movement of the driven member, said lever operating when turned on its pivot pin to spread apart the ends of the brake jaws thereby pressing their outer surfaces into frictional engagement with the brake cylinder.

2. In a brake, the combination, with a brake cylinder provided with means for preventing it from revolving backward, of a driving member and a driven member journaled concentric with the brake cylinder, said driven member being provided with projecting pins, brake-jaws formed in sections and normally revoluble in the said brake cylinder, and operating levers pivoted to the driving member between the ends of the sections of the brake-jaws and engaging with the said pins, said levers operating to spread apart the ends of the said sections and thereby press the outer surfaces of the brake-jaws into frictional engagement with the brake cylinder when moved from their normal positions by the resistance of the load to the forward movement of the driven member.

3. In a brake, the combination, with a supporting shaft, and a sleeve secured thereto and provided with laterally projecting pins; of a brake cylinder mounted loose on the said sleeve and provided with means for preventing it from revolving backward, a driving member secured to the said shaft, brake-jaws formed in sections and normally revoluble in the brake cylinder, and operating levers pivoted to the driving member between the ends of the sections of the brake-jaws and engaging with the said pins, said levers operating to spread apart the ends of the said sections and thereby press the outer surfaces of the brake-jaws into frictional engagement with the brake cylinder when moved from their normal positions by the resistance of the load to the forward movement of the driven member.

In testimony whereof I affix my signature, in presence of two witnesses.

ANTON BOLZANI.

Witnesses:
HENRY HASPER,
WOLDEMAR HAUPT.